Patented June 20, 1939

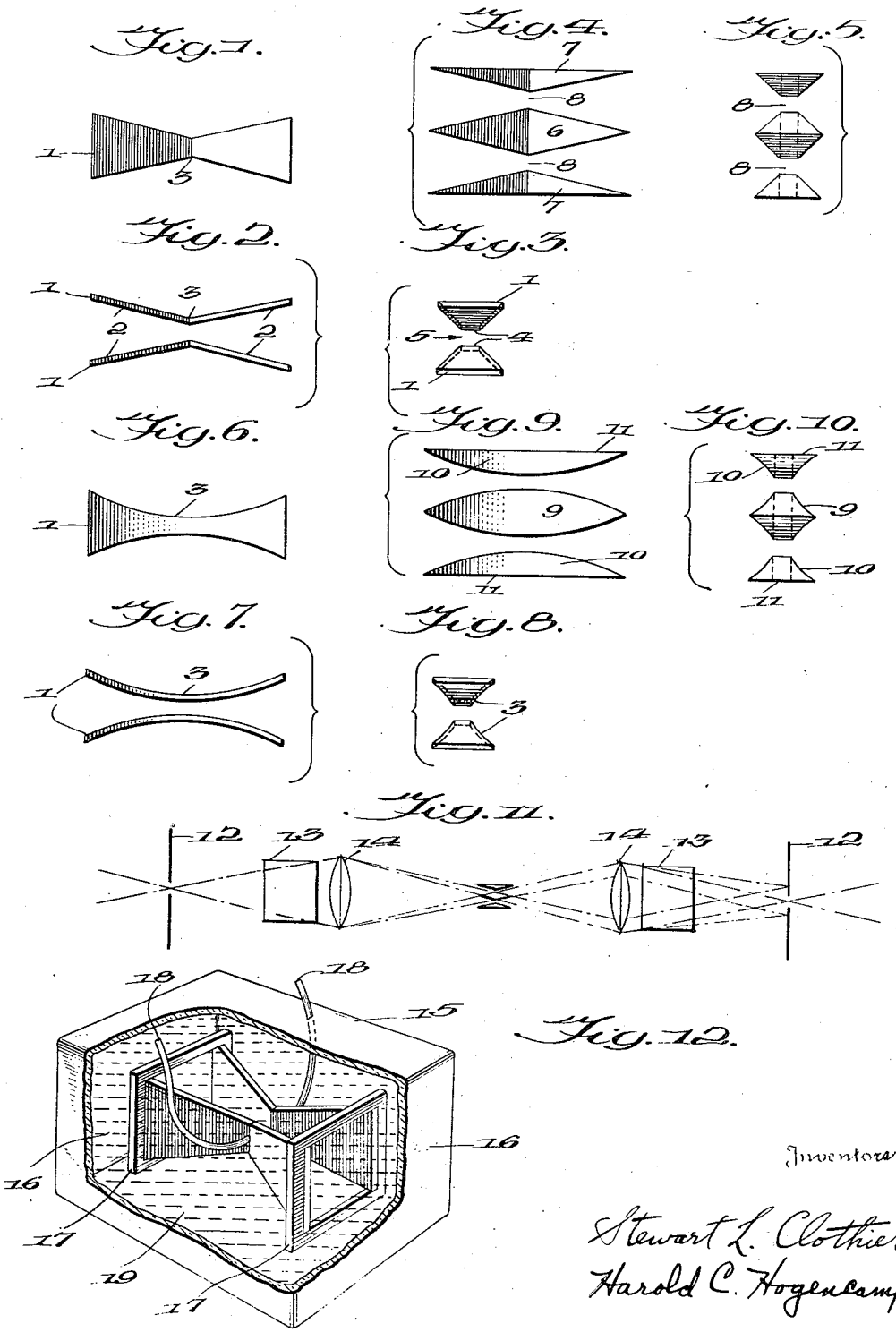

2,163,551

UNITED STATES PATENT OFFICE 2,163,551

KERR CELL ELECTRODE

Stewart L. Clothier, East Orange, and Harold C. Hogencamp, Irvington, N. J., assignors to Kolorama Laboratories, Inc., Newark, N. J., a corporation of New Jersey Application May 27, 1937, Serial No. 145,158

4 Claims. (Cl. 88—61)

This invention relates to light modulating cells of the Kerr type, and more particularly to electrodes for such cells.

There are available at present various modified forms of the original Kerr cell, all of which are characterized by the ability to modulate a beam of polarized light passing through the cell when the electrodes thereof are subjected to a suitable electrical potential. All the known cells of this general type are limited by a relatively large inherent electrostatic capacity to relatively low frequencies of modulation, and are therefore unsuitable for use in high definition television systems.

One modified form of the original Kerr cell, namely, the Wright cell, is characterized by a somewhat lower inherent electrostatic capacity, which result is achieved by designing the electrodes of the cell so that opposed surfaces of said electrodes converge towards each other in one plane and along the light axis of the cell. While this arrangement, as stated, results in a somewhat lower inherent electrostatic capacity for the cell, the capacity is still of a value such as to limit the use of the cell to frequencies of a relatively low order, due at least in part to the fact that the cell electrodes are of a substantially uniform transverse dimension throughout the entire length thereof. The reason for disposing the opposed electrodes in convergent relationship is, of course, to arrange the operative surfaces of the electrodes so as to fall or be substantially tangent to the exterior surface of the light cone passing through the cell but, obviously, due to the uniform transverse dimension of the electrodes, much of the electrode surfaces are substantially ineffective insofar as the light modulating ability of the cell is concerned, and it is this excess of ineffective electrode surface which increases the inherent electrostatic capacity of the cell.

The present invention has for its object the arrangement and disposition of the electrodes within a cell of the Kerr type in a manner such that the inherent electrostatic capacity of the cell is reduced to a minimum without in any way sacrificing or reducing the light modulating properties of the cell.

Another object of the invention is to provide a light modulating cell of the Kerr type wherein the electrodes are dimensioned and positioned to conform substantially to the configuration of the light beam passing through the cell.

These and other objects will become apparent from the following specification read in connection with the accompanying drawing wherein preferred forms of the invention have been illustrated. It will be understood, however, that such illustrations are but for the purpose of example and that various changes in size and proportion of parts may be made without departing from the spirit of the invention.

In the accompanying drawing:

Figure 1 is a side elevation of one form of cell electrode.

Fig. 2 is a top plan view of two electrodes arranged in operative relation.

Fig. 3 is an end elevation of electrodes shown in Fig. 2.

Fig. 4 is a top plan view of a multiple cell unit.

Fig. 5 is an end elevation of the electrodes of the unit shown in Fig. 4.

Fig. 6 is a side elevation of a modified form of electrode.

Fig. 7 is a top plan view of a pair of electrodes such as shown in Fig. 6.

Fig. 8 is an end view of the electrodes of Fig. 7.

Fig. 9 is a top plan view of a multiple cell unit employing the type of electrodes shown in Figs. 6, 7 and 8.

Fig. 10 is an end elevation of the electrodes shown in Fig. 9.

Fig. 11 is an optical system including a multiple cell unit of the type shown in Fig. 4.

Fig. 12 is an operative view partly in section showing a complete cell employing the electrodes of Fig. 2.

Referring more particularly to the accompanying drawing, it is to be noted that the cell electrodes forming the subject-matter of this invention are so positioned and are of such shape that they substantially conform to or in effect define the opposite faces of two truncated pyramids having rectangular or square bases and having their smallest sections joined. The angularity or divergent relation of the opposed electrode surfaces conforms substantially to that of the exterior surfaces of a cone of light passing through the cell between the electrodes. Thus, in Figs. 1, 2 and 3 we have shown electrodes I, I of any suitable conducting material, having their opposed surfaces 2, 2 arranged on opposite sides of the light axis of the cell and converging from opposite ends towards the position 3 intermediate the ends of the electrode. Preferably the position of minimum dimension designated as 3 is located midway between the ends of the electrodes. The angular disposition of the electrodes is clearly shown in Fig. 2 and as hereinbefore stated, this arrangement of the electrodes is designed so that the opposed surfaces of the electrodes define or conform to opposite surfaces of square or rectangular truncated pyramids disposed with their axes aligned and joined at their smallest cross-sections.

The electrodes 1, 1 are preferably dimensioned transversely so as to provide end portions of maximum height or width and an intermediate portion at the position 3, of minimum dimension. Thus, not only are the opposed surfaces of the electrodes arranged to follow or generally conform to the exterior surface of a cone of light passing through the cell, but, due to the decreasing transverse dimension of the electrode surfaces from the ends thereof toward the center or midsection, the electrode surfaces conform substantially to the dimension of the light cone in a direction transverse to the axis thereof. By thus fashioning the electrodes to omit excess or ineffective surface areas thereof, the inherent electrostatic capacity of the cells is reduced to a minimum while retaining the full light modulating power thereof.

Preferably, but not necessarily, the spacing of the electrodes is proportioned with reference to the angularity of the opposed surface portions 2, 2 thereof so that transverse sections made by planes intersecting said electrodes at right angles to the light axis of the cell will define figures having parallel side edges of equal length and equal to the spacing of the electrode surfaces at the point of intersection. Thus, as shown in Fig. 3, at the position 3, the opening between the electrodes is defined by parallel side edges 4, 4 which are of an equal length and substantially equal to the spacing between the electrodes at that position, as indicated by the arrow 5.

In Figs. 4 and 5 we have shown an arrangement of electrodes designed to provide a plurality of light apertures but employing three electrodes. Thus, the intermediate electrode 6 of Fig. 4 is substantially diamond-shaped in top plan view, whereas each of the exterior electrodes 7 is substantially triangular when viewed in the same manner. This disposition of electrodes provides plural light apertures 8, 8 so that by the use of one additional electrode over the arrangement shown in Figs. 1 to 3 inclusive, we may provide a cell which may pass twice the amount of light. It is understood, of course, that the electrodes of Figs. 4 and 5 are arranged and disposed with reference to each other similarly to those of Figs. 1 to 3 and that in side elevation the electrodes of Figs. 4 and 5 appear as shown in Fig. 1. This type of cell construction is particularly useful with double image polariscopes.

Instead of providing the electrodes with plane surfaces as shown in Figs. 1 to 5 inclusive, we may provide the electrodes with curved or substantially arcuate faces as shown in Figs. 6 to 10 inclusive. The curved electrodes are disposed with reference to each other in a manner similar to those in Figs. 1, 2 and 5, it being noted that in this instance the curved electrodes are also characterized by a diminishing transverse dimension on opposite ends towards the midsection thereof. This form of electrode also lends itself readily to the multiple aperture arrangement previously referred to in connection with Figs. 4 and 5, and as shown in Figs. 9 and 10. In this modification the central electrode 9 when viewed in top plan is substantially ellipsoidal or lens-shaped, whereas the external electrodes 10 may be provided with substantially flat exterior surfaces 11, the inner or operative surfaces of said electrodes 10 being generally curved as shown. It will be understood in connection with the multiple aperture arrangement shown in Fig. 9 that the electrodes in this modification are, when viewed in side elevation, similar in all respects to the showing in Fig. 6.

In Fig. 11 we have shown a diagrammatic view depicting an optical system or polariscope employing a cell having the electrodes disposed as in Fig. 4 including apertured plates 12, conventional prisms 13 and suitable lenses 14.

In Fig. 12 we have shown a typical example of a cell embodying the electrodes of the present invention, the disposition of the electrodes being that shown in Figs. 1, 2 and 3. The cell as shown comprises a suitable container 15 having transparent end walls 16 between which is mounted a pair of electrodes 1, 1 of the present invention. The electrodes may be properly mounted and spaced within the container 15 by means of suitable apertured diaphragms or frames 17, the arrangement being such that the light axis defined by the opposed electrodes 1, 1 is then in alignment with the transparent end portion 16 of the container. Suitable connections 18 may be provided for impressing upon the electrodes 1, 1 a suitable electrical potential, by reason of which the cell, when filled with an electro-optically active medium 19, will exhibit the Kerr effect upon a light beam traversing the same.

From the foregoing description it is apparent that we have provided a greatly improved cell of the Kerr type which is capable of modulating a beam of light traversing the same and which, due to its low inherent electrostatic capacity, is suitable for use in high definition television systems where relatively high frequencies are encountered. It is also to be noted that by reason of the extremely low inherent electrostatic capacity, the power requirements for operating the cell are correspondingly reduced while maintaining the full light modulating power thereof.

It is to be understood that the foregoing description is illustrative merely of various forms of the invention and is not to be interpreted as limiting the scope thereof as we contemplate any construction properly included in the appended claims.

Having thus described the invention, what we claim as new and desire to secure by Letters Patent is:

1. An electrode for a multiple aperture light modulating cell of the Kerr type comprising a conducting body which is diamond-shaped in horizontal section and rectangular in vertical section, the dimensions of the rectangles defined by successive sections between the ends of the electrode, varying both longitudinally and transversely.

2. In a light modulating cell of the Kerr type, opposed electrodes with active surfaces shaped to approach each other at their midsection, each of said active surfaces being reduced longitudinally in transverse dimension toward a midsection, whereby the opposing active surfaces define a light path having a cross-section of square pattern therebetween and of minimum cross-sectional area at the midsection, a container for said electrodes having opposite transparent end walls with the axis of the light path normal thereto, and an electro-optically transparent medium within said container.

3. In a light modulating cell of the Kerr type, opposed electrodes with active surfaces convex shaped to approach each other at their midsection, each of said active surfaces being reduced longitudinally in transverse dimension toward a midsection, whereby the opposing active surfaces define a light path having a cross-section of square pattern therebetween and of minimum cross-sectional area at the midsection, a container for said electrodes having opposite transparent end walls with the axis of the light path normal thereto, and an electro-optically transparent medium within said container.

4. In a light modulating cell of the Kerr type, opposed electrodes with plane active surfaces, each of said active surfaces being uniformly reduced longitudinally in transverse dimension toward a midsection, whereby the opposing active surfaces define a light path having a cross-section of square pattern therebetween and of minimum cross-sectional area at the midsection, a container for said electrodes having opposite transparent end walls with the axis of the light path normal thereto, and an electro-optically transparent medium within said container.

STEWART L. CLOTHIER.
HAROLD C. HOGENCAMP.